United States Patent
Wolfgang et al.

(10) Patent No.: US 10,164,736 B2
(45) Date of Patent: *Dec. 25, 2018

(54) SYSTEMS, METHODS, APPARATUS, AND COMPUTER PROGRAM PRODUCTS FOR PROVIDING FORWARD ERROR CORRECTION WITH LOW LATENCY

(71) Applicant: KENCAST, INC., Norwalk, CT (US)

(72) Inventors: H. Lewis Wolfgang, Stamford, CT (US); Michael J. Fischer, Hamden, CT (US); Weimin Fang, Stamford, CT (US)

(73) Assignee: KENCAST, INC., Stamford, CT (US)

( * ) Notice: Subject to any disclaimer, the term of this patent is extended or adjusted under 35 U.S.C. 154(b) by 30 days.

This patent is subject to a terminal disclaimer.

(21) Appl. No.: 15/189,250

(22) Filed: Jun. 22, 2016

(65) Prior Publication Data
US 2016/0308642 A1    Oct. 20, 2016

Related U.S. Application Data

(63) Continuation of application No. 14/217,973, filed on Mar. 18, 2014, now Pat. No. 9,397,783, which is a continuation of application No. 11/874,484, filed on Oct. 18, 2007, now Pat. No. 8,707,139.

(60) Provisional application No. 60/829,910, filed on Oct. 18, 2006.

(51) Int. Cl.
*H04L 1/00*     (2006.01)
*H04L 12/26*    (2006.01)
*H04L 12/873*   (2013.01)
*H04L 29/06*    (2006.01)
*H04N 21/44*    (2011.01)
*H04N 21/4402*  (2011.01)

(52) U.S. Cl.
CPC ............ *H04L 1/0045* (2013.01); *H04L 1/007* (2013.01); *H04L 43/0829* (2013.01); *H04L 47/522* (2013.01); *H04L 65/80* (2013.01); *H04N 21/44004* (2013.01); *H04N 21/440281* (2013.01)

(58) Field of Classification Search
None
See application file for complete search history.

(56) References Cited

U.S. PATENT DOCUMENTS

| 4,009,347 A | 2/1977 | Flemming et al. ....... 179/15 BS |
| 4,222,102 A | 9/1980 | Jansen et al. ................. 364/200 |
| 4,525,833 A | 6/1985 | Cau et al. ......................... 370/99 |
| 4,616,338 A | 10/1986 | Helen et al. ................. 364/900 |

(Continued)

OTHER PUBLICATIONS

Asmuth et al., "Proceedings of the 1982 Symposium on Security and Privacy," IEEE Computer Society, Apr. 25-26, 1982, p. 156-169, Oakland CA.

(Continued)

*Primary Examiner* — Daniel F. McMahon
(74) *Attorney, Agent, or Firm* — Merchant & Gould P.C.

(57) ABSTRACT

Systems, methods, apparatus and computer program products for providing forward error correction with low latency to live streams in networks are provided. Source data is output at a rate less than the rate of a source stream, a buffer is built, and an FEC decoder FEC decodes the source data. Decoded packets are output at a rate equal to the rate of the source stream.

20 Claims, 6 Drawing Sheets

(56) References Cited

U.S. PATENT DOCUMENTS

| | | | |
|---|---|---|---|
| 4,718,066 A | 1/1988 | Rogard | 371/35 |
| 4,907,277 A | 3/1990 | Callens et al. | 381/46 |
| 5,122,988 A | 6/1992 | Graeve | 365/219 |
| 5,272,675 A | 12/1993 | Kobayashi | 365/221 |
| 5,388,074 A | 2/1995 | Buckenmaier | 365/189 |
| 5,485,474 A | 1/1996 | Rabin | 371/37.1 |
| 5,594,490 A | 1/1997 | Dawson et al. | 348/6 |
| 5,600,663 A | 2/1997 | Ayanoglu et al. | 371/41 |
| 5,617,541 A | 4/1997 | Albanese et al. | 395/200.13 |
| 5,631,907 A | 5/1997 | Guarneri et al. | 370/474 |
| 5,768,533 A | 6/1998 | Ran | 395/200.77 |
| 5,790,524 A | 8/1998 | Bennett et al. | 370/244 |
| 5,815,514 A | 9/1998 | Gray | 371/42 |
| 5,903,574 A | 5/1999 | Lyons | 371/5.1 |
| 5,959,974 A | 9/1999 | Badt et al. | 370/233 |
| 6,012,159 A | 1/2000 | Fischer et al. | 714/755 |
| 6,031,818 A | 2/2000 | Lo et al. | 370/216 |
| 6,052,819 A | 4/2000 | Barker et al. | 714/776 |
| 6,104,757 A | 8/2000 | Rhee | 375/240 |
| 6,141,788 A | 10/2000 | Rosenberg et al. | 714/774 |
| 6,151,696 A | 11/2000 | Miller et al. | 714/748 |
| 6,189,039 B1 | 2/2001 | Harvey et al. | 709/232 |
| 6,208,274 B1 * | 3/2001 | Taori | H03M 7/42 341/67 |
| 6,249,810 B1 | 6/2001 | Kiraly | 709/217 |
| 6,272,658 B1 | 8/2001 | Steele et al. | 714/752 |
| 6,289,054 B1 | 9/2001 | Rhee | 375/240.27 |
| 6,295,302 B1 * | 9/2001 | Hellwig | H04M 11/068 370/345 |
| 6,307,487 B1 | 10/2001 | Luby | 341/50 |
| 6,317,462 B1 | 11/2001 | Boyce | 375/240.27 |
| 6,320,520 B1 | 11/2001 | Luby | 341/50 |
| 6,336,200 B1 | 1/2002 | Wolfgang | 714/752 |
| 6,370,666 B1 | 4/2002 | Lou et al. | 714/751 |
| 6,373,406 B2 | 4/2002 | Luby | 341/50 |
| 6,411,223 B1 | 6/2002 | Haken et al. | 341/50 |
| 6,434,191 B1 | 8/2002 | Agrawal et al. | 375/227 |
| 6,445,717 B1 | 9/2002 | Gibson et al. | 370/473 |
| 6,463,080 B1 | 10/2002 | Wildey | 370/508 |
| 6,486,803 B1 | 11/2002 | Luby et al. | 341/50 |
| 6,496,477 B1 | 12/2002 | Perkins et al. | 370/228 |
| 6,498,821 B2 | 12/2002 | Jonas et al. | 375/347 |
| 6,526,022 B1 | 2/2003 | Chiu et al. | 370/229 |
| 6,567,929 B1 | 5/2003 | Bhagavath et al. | 714/18 |
| 6,567,948 B2 | 5/2003 | Steele et al. | 714/746 |
| 6,570,843 B1 | 5/2003 | Wolfgang | 370/216 |
| 6,574,213 B1 | 6/2003 | Anandakumar et al. | 370/349 |
| 6,574,795 B1 | 6/2003 | Carr | 725/71 |
| 6,594,798 B1 | 7/2003 | Chou et al. | 714/820 |
| 6,606,723 B2 | 8/2003 | Wolfgang | 714/776 |
| 6,609,223 B1 | 8/2003 | Wolfgang | 714/752 |
| 6,614,366 B2 | 9/2003 | Luby | 341/50 |
| 6,671,807 B1 | 12/2003 | Jaisimha et al. | 713/193 |
| 6,693,907 B1 | 2/2004 | Wesley et al. | 370/390 |
| 6,701,373 B1 | 3/2004 | Sakazawa et al. | 709/232 |
| 6,735,634 B1 | 5/2004 | Geagan, III et al. | 709/235 |
| 6,765,889 B1 | 7/2004 | Ludwig | 370/331 |
| 6,782,490 B2 | 8/2004 | Maxemchuk et al. | 714/18 |
| 6,804,244 B1 | 10/2004 | Anandakumar et al. | 370/395.21 |
| 6,868,083 B2 | 3/2005 | Apostolopoulos et al. | 370/392 |
| 6,937,582 B1 | 8/2005 | Kronestedt | 370/329 |
| 7,024,609 B2 | 4/2006 | Wolfgang et al. | 714/748 |
| 7,068,601 B2 | 6/2006 | Abdelilah et al. | 370/231 |
| 7,139,243 B2 | 11/2006 | Okumura | 370/248 |
| 7,315,967 B2 | 1/2008 | Azenko et al. | 714/704 |
| 7,324,578 B2 | 1/2008 | Kwon et al. | 375/135 |
| 7,418,651 B2 | 8/2008 | Luby et al. | 714/800 |
| 7,425,905 B1 * | 9/2008 | Oberg | H03M 5/145 341/50 |
| 7,516,387 B2 | 4/2009 | Arnold et al. | 714/751 |
| 7,739,580 B1 | 6/2010 | Fang et al. | 714/776 |
| 7,796,517 B2 | 9/2010 | Chen et al. | 370/235 |
| 8,223,643 B1 | 7/2012 | Wolfgang | 370/235 |
| 2001/0033611 A1 | 10/2001 | Grimwood et al. | 375/219 |
| 2001/0046271 A1 | 11/2001 | Jonas et al. | 375/347 |
| 2001/0047439 A1 | 11/2001 | Daniel et al. | 710/52 |
| 2002/0035730 A1 | 3/2002 | Ollikainen et al. | 725/93 |
| 2002/0097678 A1 | 7/2002 | Bisher, Jr. et al. | 370/232 |
| 2003/0009718 A1 | 1/2003 | Wolfgang et al. | 714/751 |
| 2003/0229839 A1 | 12/2003 | Wang et al. | 714/776 |
| 2004/0025186 A1 | 2/2004 | Jennings et al. | 725/93 |
| 2004/0170201 A1 * | 9/2004 | Kubo | H03M 13/2721 370/535 |
| 2005/0071602 A1 * | 3/2005 | Niell | G06F 9/30098 712/202 |
| 2006/0059409 A1 * | 3/2006 | Lee | H03M 13/1515 714/784 |
| 2006/0064626 A1 | 3/2006 | Fischer et al. | 714/776 |
| 2006/0253763 A1 | 11/2006 | Oliva et al. | 714/746 |
| 2007/0022361 A1 | 1/2007 | Bauer et al. | 714/776 |
| 2007/0150791 A1 | 6/2007 | Gross et al. | 714/763 |
| 2007/0220405 A1 * | 9/2007 | Arnold | H03M 13/2703 714/776 |
| 2007/0266274 A1 | 11/2007 | Lin | 714/699 |
| 2008/0002580 A1 | 1/2008 | Kawada et al. | 370/231 |
| 2008/0098284 A1 * | 4/2008 | Wolfgang | H04L 1/007 714/776 |
| 2008/0117819 A1 | 5/2008 | Flott et al. | 370/232 |
| 2008/0244001 A1 | 10/2008 | Fang | 709/203 |
| 2008/0285476 A1 | 11/2008 | Rajakarunanayake | 370/252 |
| 2008/0298271 A1 | 12/2008 | Morinaga et al. | 370/252 |
| 2009/0177948 A1 | 7/2009 | Fischer et al. | 714/776 |
| 2009/0193314 A1 | 7/2009 | Melliar-Smith et al. | 714/755 |
| 2009/0210773 A1 | 8/2009 | Fang | 714/776 |
| 2010/0005178 A1 | 1/2010 | Sindelaru et al. | 709/228 |
| 2010/0218074 A1 | 8/2010 | Fang et al. | 714/776 |

OTHER PUBLICATIONS

Karnin et al., "On Secret Sharing Systems," IEEE Transactions on Information Theory, Jan. 1983, vol. IT-29, No. 1.

Mackay, David J.C., "Information Theory, Inference, and Learning Algorithms," Cambridge University Press, 2003.

McAuley, Anthony J, "Reliable Broadband Communication Using a Burst Erasure Correcting Code," SIGCOMM '90 Symposium, Sep. 1990, p. 297-306.

McEliece et al., "On Sharing Secrets and Reed-Solomon Codes," Communications of the ACM, Sep. 1981, vol. 24.

Miller, C Kenneth, "Reliable Multicast Protocols: A Practical View", Local Computer Networks Conference Proceedings, Nov. 1997, p. 369-378.

Rabin, Michael O, "Efficient Dispersal of Information for Security, Load Balancing, and Fault Tolerance," Journal of the Assoc. for Computing Machinery, Apr. 1998, p. 335-348, vol. 36, No. 2.

Rabin, Michael O, "Probabilistic Algorithms in Finite Fields," SIAM J. Comput., May 1980, p. 273-280, vol. 9, No. 2.

Shamir, Adi, "How to Share a Secret," Communications of the ACM, Nov. 1979, p. 612-613, vol. 22, No. 11.

* cited by examiner

SYSTEMS, METHODS, APPARATUS, AND COMPUTER PROGRAM PRODUCTS FOR PROVIDING FORWARD ERROR CORRECTION WITH LOW LATENCY

CROSS-REFERENCE TO RELATED APPLICATIONS

This application is a continuation of U.S. patent application Ser. No. 14/217,973, filed Mar. 18, 2014, which is a continuation of U.S. patent application Ser. No. 11/874,484, filed on Oct. 18, 2007, and issuing as U.S. Pat. No. 8,707, 139 on Apr. 22, 2014, which claims the benefit of U.S. Provisional Application No. 60/829,910 filed on Oct. 18, 2006. The entire disclosures of these earlier applications are hereby incorporated by reference as if fully set forth herein.

BACKGROUND

Field

Example aspects of the present invention generally relate to data coding and decoding and, more particularly, to systems and methods for forward error correction (FEC) coding and decoding in multi-link and/or multi-networks.

Related Art

U.S. Pat. Nos. 6,012,159, 6,272,658, 6,336,200, 6,570, 843, 6,609,223, and 7,024,609 and U.S. patent application Ser. No. 11/276,225, filed on Feb. 17, 2006, and Ser. No. 11/516,197, filed Sep. 6, 2006, each patent and application of which is incorporated herein by reference, describe methods for applying forward error correction (FEC) to protect streams of data from outages. These methods also allow a receiver to recover data which is lost in outages.

FEC encoding sometimes may introduce latency. For example, if FEC is applied to a time window of x seconds, then the receiver component may be required to buffer at least x seconds of data to perform error correction decoding on the data before it can be output to a player process.

In many applications, such as for the transmission of video, it is desirable to begin outputting data with as little delay as possible. For example, if the user is switching channels between different video streams, it is undesirable to require the user to wait for several seconds before viewing the new video stream.

The usefulness of the forward error correction methods described in, for example, U.S. Pat. No. 6,609,223 increases as the time window increases (that is, the FEC methods are able to recover from larger outages when the time window is larger). Therefore, it is also desirable to allow the time windows used to be large, for example, 30 seconds or more.

SUMMARY

In an example embodiment described herein, systems, methods, apparatus and computer program products for performing forward error correction are provided including outputting source data at a rate less than the rate of a source stream, building a buffer, FEC decoding the source data, and outputting the packets at a rate equal to the rate of the source stream.

In another example embodiment described herein, systems, methods, apparatus and computer program products for performing forward error correction are provided including outputting source data at a rate less than the rate of the source stream, building a buffer, correcting packet losses while the buffer is being built, and outputting reconstructed source packets at a rate equal to the rate of the source stream.

In a further example embodiment described herein, systems, methods, apparatus and computer program products for performing forward error correction are provided including transmitting an FEC encoded stream using a time window of t seconds, transmitting an unencoded stream consisting of source packets shifted t seconds with respect to the data in the source stream, receiving the FEC encoded stream and the unencoded stream, outputting the unencoded stream for the first t seconds, collecting data from the encoded stream, after t seconds, FEC decoding the FEC encoded stream, and outputting the decoded stream.

In yet another example embodiment described herein, systems, methods, apparatus and computer program products for performing forward error correction are provided including transmitting an FEC stream using a time window of t seconds, transmitting a second stream consisting of source packets shifted t seconds with respect to the data in the FEC stream, receiving the FEC stream and the second stream, outputting the second stream for the first t seconds, collecting data from the FEC stream, after t seconds, FEC decoding the FEC stream, and outputting the decoded FEC stream.

In another example embodiment described herein, systems, methods, apparatus and computer program products for performing forward error correction are provided including receiving information about when one or more receivers are operational, transmitting an FEC encoded stream using a time window of t seconds, transmitting an unencoded stream of source packets shifted t seconds with respect to the data in the source stream, where the unencoded stream is transmitted when a receiver is within the first t seconds of receiving it, receiving the FEC encoded stream and the second stream, outputting the unencoded stream for the first t seconds, collecting data from the encoded stream, after t seconds, FEC decoding the FEC encoded stream, and outputting the decoded stream.

In yet another embodiment described herein, a receiver for providing forward error correction is described. The receiver includes an output unit configured to output source data at a rate less than the rate of a source stream, a buffer, an FEC decoder configured to FEC decode the source data. The output unit is further configured to output the packets at a rate equal to the rate of the source stream.

In another embodiment, a receiver for providing forward error correction is described. The receiver includes an output unit configured to output source data at a rate less than the rate of the source stream, a buffer, a correction unit configured to correct packet losses while the buffer is being built. The output unit further configured to output reconstructed source packets at a rate equal to the rate of the source stream.

In yet another embodiment a system for providing forward error correction is provided. The system includes a transmitter to transmit an FEC encoded stream using a time window of t seconds and an unencoded stream consisting of source packets shifted t seconds with respect to the data in the source stream, and a receiver to receive the FEC encoded stream and the unencoded stream, to output the unencoded stream for the first t seconds, collect data from the encoded stream, FEC decode the FEC encoded stream after t seconds, and output the decoded stream.

In yet another embodiment, a system for providing forward error correction, is described. The system includes at least one transmitter to transmit an FEC stream using a time window of t seconds and a second stream consisting of source packets shifted t seconds with respect to the data in the FEC stream, and a receiver to receive the FEC stream and the second stream, output the second stream for the first t seconds, collect data from the FEC stream, FEC decoding the FEC stream after t seconds, and output the decoded FEC stream.

In an example embodiment described herein, a system for providing forward error correction is provided. The system includes at least one transmitter operable to receive information about when one or more receivers are operational, transmit an FEC encoded stream using a time window of t seconds and an unencoded stream of source packets shifted t seconds with respect to the data in the source stream, where the unencoded stream is transmitted when a receiver is within the first t seconds of receiving it, and a receiver operable to receive the FEC encoded stream and the second stream, output the unencoded stream for the first t seconds, collect data from the encoded stream, FEC decode the FEC encoded stream after t seconds, and output the decoded stream.

Further features and advantages, as well as the structure and operation, of various example embodiments of the present invention are described in detail below with reference to the accompanying drawings.

DETAILED DESCRIPTION OF THE DRAWINGS

The features and advantages of the example embodiments of the invention presented herein will become more apparent from the detailed description set forth below when taken in conjunction with the drawings in which like reference numbers indicate identical or functionally similar elements.

DETAILED DESCRIPTION

The present invention is now described in more detail herein in terms of exemplary systems, methods, apparatus and computer program products for providing forward error correction with low latency to live streams in networks.

This is for convenience only and is not intended to limit the application of the present invention. In fact, after reading the following description, it will be apparent to one skilled in the relevant art(s) how to implement the following invention in alternative embodiments (e.g., in systems that transmit and receive content in the form of files, in systems which perform transmission over more than two networks, etc.).

Generally, the example embodiments described below describe methods and systems for applying FEC to a live stream of data while maintaining both the ability to start output quickly, and the ability to provide FEC protection across a large window of data. These methods provide quick output from the receiver at the expense of providing partial or no error correcting capability during the initial portion of the output.

Figure 1:
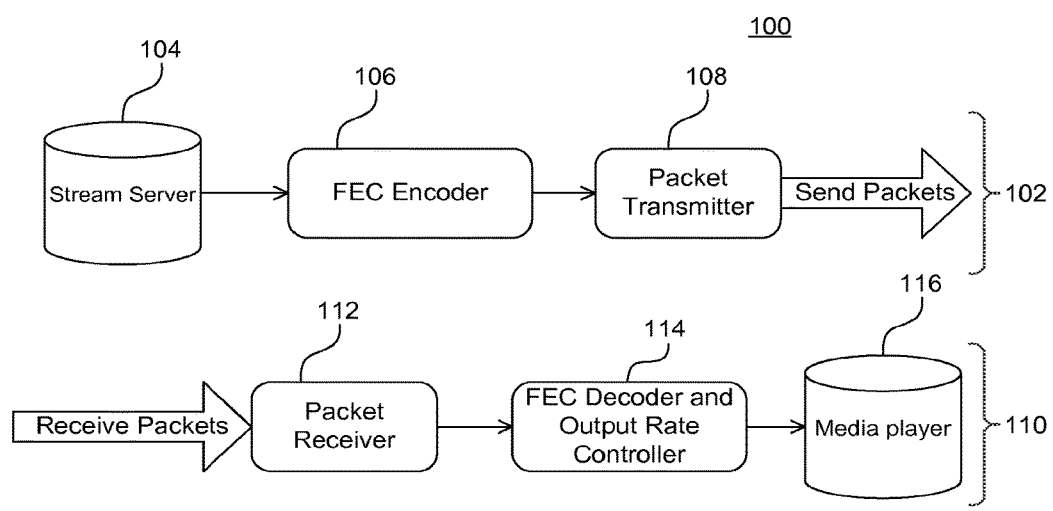
FIG. 1 depicts a diagram of a system for providing forward error correction in accordance with an example embodiment of the present invention.

FIG. 1 depicts a diagram of a system 100 for providing forward error correction ("FEC") in accordance with an example embodiment of the present invention. As shown in FIG. 1, system 100 includes a transmitter system 102 including a stream server 104, an FEC encoder 106 and a packet transmitter 108. Stream server 104 outputs a stream of data packets. The packet stream from stream server 104 is fed to FEC encoder 106, which encodes the data to enable error correction. In turn, the encoded data is fed to packet transmitter 108 which communicates the packets through typical transmission channels, such as satellite, mobile, television broadcast systems, and the like.

FIG. 1 also depicts a receiver system 110 in accordance with an example embodiment of the present invention. Receiver system 110 includes a packet receiver 112, an FEC decoder and output rate controller 114 and a media player 116. Generally, packet receiver 112 receives packets from transmitter system 102 and communicates the received packets to FEC decoder and output rate controller 114. FEC decoder and output rate controller 114 decodes the encoded packets received by packet receiver 112 and controls the rate in which they are output. In turn, the decoded packets are fed to media player 116 to playback the transmitted content.

The above system operates in accordance with what is referred to for convenience as case 1. In case 1, the output rate of the received packets is modified by FEC decoder and output rate controller 114. As described in the aforementioned patents and patent applications, the source data is included in the output stream. This source data can be accessed without applying FEC decoding and with little or no delay. In case 1, a transmitter 102 sends an FEC encoded data stream to one or more receivers, where the encoded data stream has the properties that (1) each receiver can begin decoding and outputting data after it has received the FEC encoded data stream for t seconds, and (2) the source data is included within the FEC encoded data stream, so that the packets of the source data which are received can be accessed without applying FEC decoding with little or no delay.

When each receiver 110 starts, it begins outputting the source data, without applying FEC decoding, at a rate less than the rate of the source stream, e.g., at 95% of the rate of the source stream. Because the output rate of the receiver is less than the input rate, receiver 110 can build up a buffer (not shown). When it has collected information in its buffer equal to the latency required to perform FEC decoding, receiver system 110 begins to perform FEC decoding and to output the packets at the normal rate (e.g., a rate equal to the rate of the source stream) using FEC decoder and output rate controller 114.

The packets can be processed at a lower than normal rate as well. For example, for a stream consisting of video and audio, it is possible to play the stream at a slightly slower rate than real-time without impacting the user experience. Changing video frame rate is straightforward, while changing audio rates often involves correcting for a shift in pitch.

In another example embodiment, referred to herein as case 2, the initial output rate is modified with partial decoding. As described above with respect to case 1, when receiver starts, it begins outputting the source data, without applying FEC decoding, at a rate less than the rate of the source stream. As the receiver system 110 begins to build up a buffer, it may be possible to correct for some packet losses, even before enough buffer is available to implement the complete FEC decoding process.

For example, when the FEC encoding consists of several shares which are interleaved as described in U.S. Pat. No.

6,609,223, and which may be shifted with respect to each other as described in U.S. application Ser. No. 11/516,197, it is possible to do the FEC decoding for a given share containing N source packets and K FEC packets when at least N packets have been received in total. In the decoding techniques described in aforementioned patents and patent applications the decoding process normally occurs after any of the packets from the given share are received, and before any of the corresponding source packets are output. The packets of the given share are sent evenly distributed within the time window of t seconds.

Partial decoding can take place whenever at least N packets of the share have been received (this may take place in less than t seconds, or in exactly t seconds if exactly N packets of the share are received at all, including the last packet), even if the output has not been delayed by t seconds. At the time decoding takes place, all of the source packets of the share can be recovered, but only the source packets whose output time has not yet come are useful—it is in this sense that the decoding is partial. For example, when the delay has built up to the point that the output packets are output t/2 seconds after their reception, recoverable source packets which lie in the second half of the share containing them can be recovered prior to the need to output them.

In this way, the ability to recover missing source packets builds up gradually and linearly as the buffer builds up, beginning with no ability to recover missing source packets, and ending with the properties described in the aforementioned patents and patent applications when the buffer has built up to include t seconds worth of data.

Figure 2:
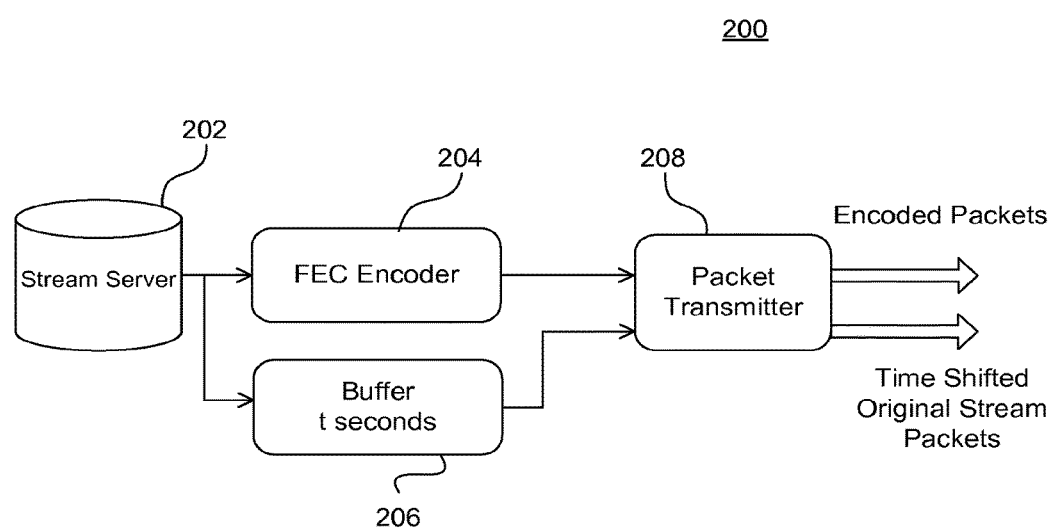
FIG. 2 depicts a diagram of a transmitter system in accordance with an example embodiment of the present invention.

FIG. 2 depicts a diagram of a transmitter system 200 in accordance with an example embodiment of the present invention referred to for convenience as case 3. A stream from stream server 202 is split and fed to an FEC encoder 204 and a buffer 206 which buffers the packet stream for t seconds. The encoded and buffered stream packets are fed to a packet transmitter 208 which transmits both the encoded packets and time shifted original stream packets.

In an example embodiment, transmitter system 200 sends one data stream which is FEC encoded such that each receiver can begin outputting decoded data after it has received the FEC encoded data stream for t seconds. U.S. Pat. No. 6,609,223 and U.S. application Ser. No. 11/516,197, provide examples of transmitter/receiver encoding mechanisms having these properties. Transmitter system 200 sends a second stream consisting of source packets only, which are shifted t seconds by buffer 206 with respect to the data in the source stream. That is, the data in the unencoded stream corresponds to the data of the encoded stream t seconds in the past.

Figure 4:
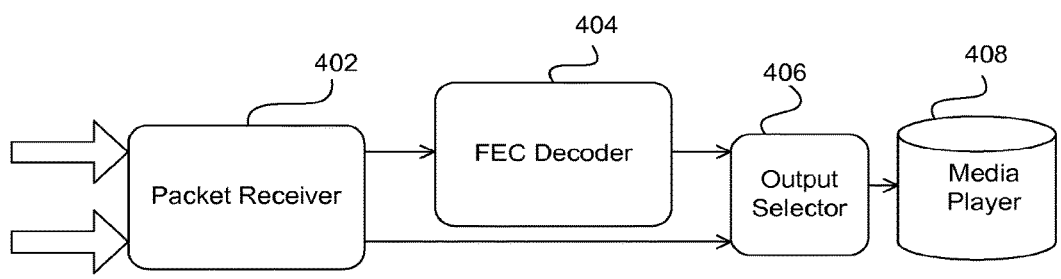
FIG. 4 depicts a receiver system in accordance with an example embodiment of the present invention.

FIG. 4 depicts an example receiver system 400 in accordance with an example embodiment of the present invention and corresponds to case 3 described above and case 3a described below. Receiver system 400 includes a packet receiver 402 and an FEC decoder 404, both of which feed an output selector 406 which, in turn, feeds a media player 408. Particularly, after t seconds of operation, receiver system 400 can begin doing FEC decoding on the encoded stream using FEC decoder 404. Output selector 406 outputs the received packets of an unencoded stream for the first t seconds (without any forward error correction), and after t seconds outputs data from FEC decoder 404. Because of the time shifting between the streams, this results in a smooth transition (that is, the unencoded stream is time-shifted to match the latency introduced by the FEC decoding process).

Figure 3:
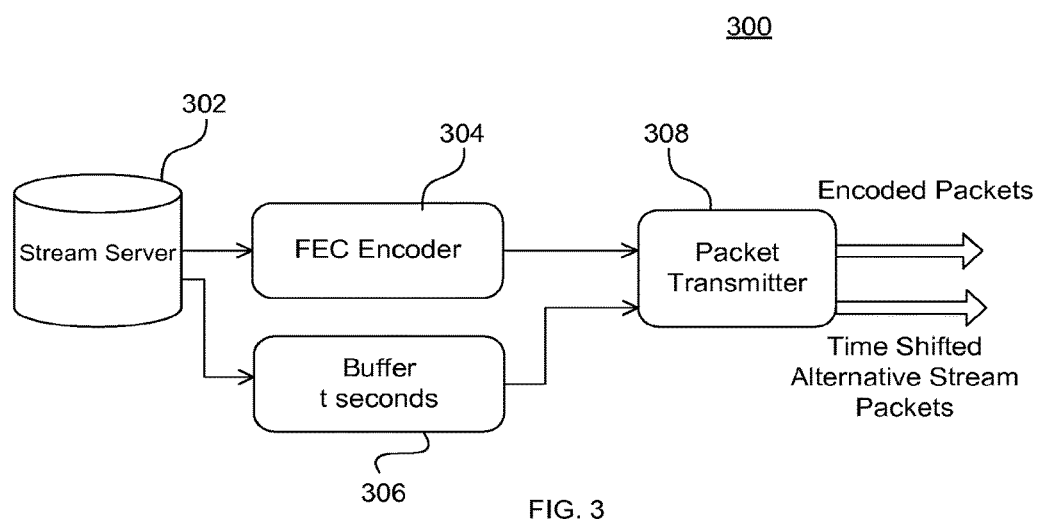
FIG. 3 depicts a diagram of a transmitter system in accordance with an example embodiment of the present invention.

Referring to FIG. 3, in another embodiment, referred to herein for convenience as case 3a, transmitter system 300 is tailored for video streaming applications. In such applications, the unencoded source stream used at the beginning of reception in case 3 (described above with respect to FIG. 2) may be replaced by an alternative encoding of the same video content (for example, at lower quality or a lower framerate) to reduce the overall bandwidth requirements. Transmitter system 300 includes a stream server 302 which provides two packet streams, one having a lower quality or a lower frame rate than the other. One packet stream is fed to an FEC encoder 304 and the other is fed to buffer 306, which buffers the packet stream for t seconds. The encoded and buffered stream packets are fed to a packet transmitter 308 which transmits both the encoded packets and time shifted alternative stream packets.

Receiver system 400 processes a transmission received in accordance with case 3 as described above with respect to FIG. 4.

Figure 5:
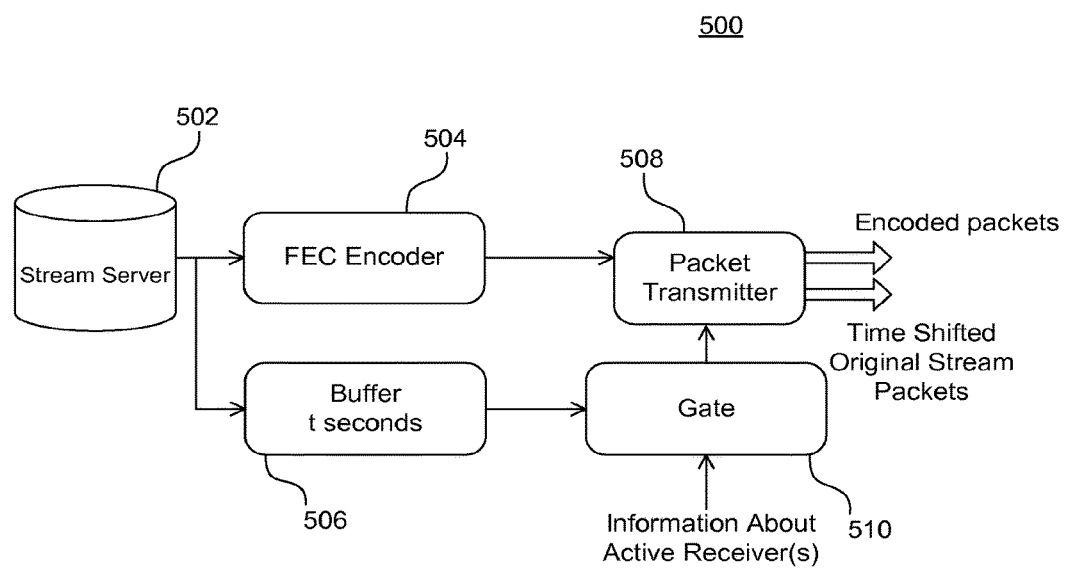
FIG. 5 depicts a transmitter system in accordance with an example embodiment of the present invention.

FIG. 5 depicts an example transmitter system 500 in accordance with an example embodiment of the present invention. This embodiment, referred to for convenience as case 4, is tailored for two-way (interactive) applications. This case is similar to case 3. Case 3 has the advantage that it does not require any special steps to be taken in playing back the stream, but requires additional bandwidth. In some cases, this additional bandwidth can be reduced. In case 4, a portion of an additional stream is sent.

Referring to FIG. 5, transmitter system 500 includes a stream server 502 which feeds a packet stream to an FEC encoder 504 and buffer 506 which buffers the stream packets by t seconds. FEC encoder 504 feeds encoded packets to a packet transmitter 508. Buffer 506 feeds the time shifted original stream packets to a gate 510. Based on information about which receivers are active, gate 510 either feeds the time shifted original stream packets to packet transmitter 508, or discards them. Packet transmitter 508, in turn, transmits both the encoded packets and the time shifted original stream packets.

For a given receiver, the unencoded source stream used in case 3 described above is only used for t seconds. In an interactive application, where the transmitter receives information about when receivers are receiving the stream (i.e., case 4), the transmitter can send the unencoded source stream only when a receiver is within the first t seconds of receiving it. This saves the additional bandwidth, whenever a period of t seconds occurs without a receiver starting to receive the stream.

Figure 6:
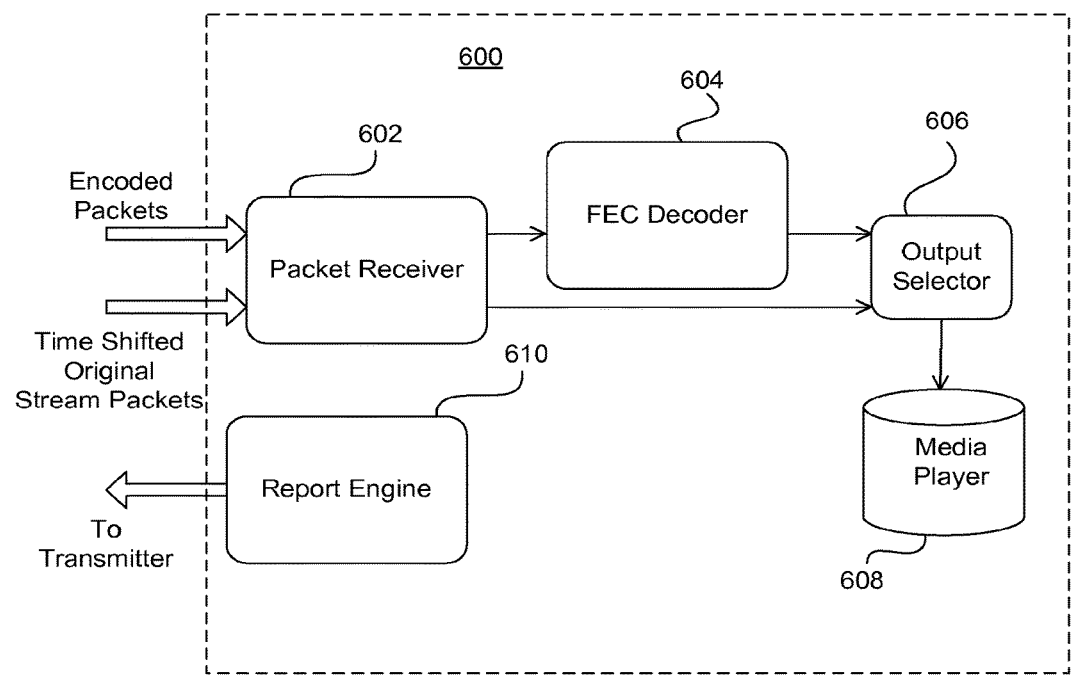
FIG. 6 depicts a receiver system in accordance with an example embodiment of the present invention.

FIG. 6 depicts an example receiver system 600 in accordance with an example embodiment of the present invention. As shown in FIG. 6, receiver system 600 includes a packet receiver 602 to receive both the encoded packets and time shifted original stream packets, from for example, transmitter system 500 (i.e., case 4). The encoded packets are decoded by FEC decoder 604 which, in turn, feeds the decoded packets to an output selector 606. Packet receiver 602 also feeds the time shifted original stream packets to output selector 606. For the first t seconds of operation, output selector 606 feeds the time shifted original stream packets to a media player 608 for playback, and after t seconds output selector 606 feeds the decoder packets to media player 608 for playback. A report engine 610 communicates to the transmitter 500 information about when this receiver is receiving the stream, by, for example, telephone, satellite, modem, optical, or other hard-line or wireless medium.

For many applications, such as television, it may be that most receivers start receiving the stream at close to the same time, and a significant bandwidth savings may occur.

In an alternative embodiment, the unencoded source stream for the first t seconds can be delivered to each receiver individually. The delivery can take place on an alternative means (i.e., channel or other mechanism). In addition, the unencoded source stream for the first t seconds may be delivered at a faster rate so as to arrive in less than t seconds.

The example embodiments of the invention (i.e., systems 100-600, and the processes described above, or any part(s) or function(s) thereof) may be implemented using hardware, software or a combination thereof and may be implemented in one or more computer systems or other processing systems. Useful machines for performing the operation of the example embodiments presented herein include general purpose digital computers or similar devices.

From a hardware standpoint, the transmitter and receiver systems described above typically include one or more components, such as one or more microprocessors, for performing the arithmetic and/or logical operations required for program execution, and storage media, such as one or more disk drives or memory cards (e.g., flash memory) for program and data storage, and a random access memory, for temporary data and program instruction storage. From a software standpoint, a processor typically includes software resident on a storage media (e.g., a disk drive or memory card), which, when executed, directs the processor in performing transmission and reception functions. The processor software may run on an operating system stored on the storage media, such as, for example, UNIX or Windows (e.g., NT, XP, Vista), Linux, and the like, and can adhere to various protocols. As is well known in the art, processors can run different operating systems, and can contain different types of software, each type devoted to a different function, such as handling and managing data/information from a particular source, or transforming data/information from one format into another format. It should thus be clear that the embodiments described herein are not to be construed as being limited for use with any particular type of server computer, and that any other suitable type of device for facilitating the exchange and storage of information may be employed instead.

The transmitter and receiver systems described above may include plural separate processors, where each is dedicated to a separate application, such as, for example, a data application, a voice application, and a video application.

Software embodiments of the example embodiments presented herein may be provided as a computer program product, or software, that may include an article of manufacture on a machine-accessible or machine-readable medium having instructions. The instructions on the machine-accessible or machine-readable medium may be used to program a computer system or other electronic device. The machine-readable medium may include, but is not limited to, floppy diskettes, optical disks, CD-ROMs, and magneto-optical disks or other type of media/machine-readable medium suitable for storing or transmitting electronic instructions. The techniques described herein are not limited to any particular software configuration. They may find applicability in any computing or processing environment. The terms "machine-accessible medium" or "machine-readable medium" used herein shall include any medium that is capable of storing, encoding, or transmitting a sequence of instructions for execution by the machine and that cause the machine to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

While various example embodiments of the present invention have been described above, it should be understood that they have been presented by way of example, and not limitation. It will be apparent to persons skilled in the relevant art(s) that various changes in form and detail can be made therein. Thus, the present invention should not be limited by any of the above described example embodiments, but should be defined only in accordance with the following claims and their equivalents.

In addition, it should be understood that the FIGS. 1-6 are presented for example purposes only. The architecture and processes of the example embodiments presented herein are sufficiently flexible and configurable, such that they may be utilized in ways other than that shown in the accompanying figures.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the example embodiments presented herein in any way. It is also to be understood that the processes recited in the claims need not be performed in the order presented.

What is claimed is:

1. A method for providing forward error correction (FEC), comprising steps of:
   receiving, by a packet receiver, source data at a first rate;
   outputting, using an output selector, the source data at a rate less than the first rate;
   collecting, in a buffer, the source data;
   FEC decoding, using an FEC decoder, the source data, thereby generating decoded data; and
   after completing the outputting, using the output selector, the source data at the rate less than the first rate, outputting, using the output selector, the decoded data at a rate equal to the first rate, either after collecting the source data in the buffer for a predetermined time duration or after collecting a predetermined amount of the source data in the buffer.

2. The method of claim 1, further comprising a step of:
   triggering the step of outputting using the output selector the decoded data at the rate equal to the first rate, when the source data has been collected in the buffer for the predetermined time duration.

3. The method of claim 1, further comprising a step of:
   triggering the step of outputting using the output selector the decoded data at the rate equal to the first rate, when the predetermined amount of the source data has been collected in the buffer.

4. A receiver for providing forward error correction (FEC), comprising:
   a packet receiver configured to receive source data at a first rate;
   an output selector configured to output the source data at a rate less than the first rate;
   a buffer configured to collect the source data;
   an FEC decoder configured to FEC decode the source data, thereby generating decoded data; and
   said output selector further configured to, after completing the output of the source data at a rate less than first rate, output the decoded data at a rate equal to the first rate, either after collecting the source data in the buffer for a predetermined time duration or after collecting a predetermined amount of the source data in the buffer.

5. A non-transitory computer-readable medium having stored therein a computer program that, when executed by a computer processor, causes the computer processor to perform a method for providing forward error correction (FEC), wherein the method comprises steps of:
receiving, by a packet receiver, source data at a first rate;
outputting, using an output selector, the source data at a rate less than the first rate;
collecting the source data in a buffer;
FEC decoding, using an FEC decoder, the source data thereby generating decoded data; and
after completing the outputting, using the output selector, the source data at the rate less than the first rate, outputting, using the output selector, the decoded data at a rate equal to the first rate, either after collecting the source data in the buffer for a predetermined time duration or after collecting a predetermined amount of the source data in the buffer.

6. A method for providing forward error correction, comprising steps of:
receiving, by a packet receiver, source packets at a first rate;
outputting, using an output selector, the source packets at a rate less than the first rate;
collecting the source packets in a buffer;
correcting, using a correction unit, packet losses; and
after completing the outputting, using the output selector, the source packets at the rate less than the first rate, outputting, using the output selector, reconstructed source packets at a rate equal to the first rate, either after collecting the source packets in the buffer for a predetermined time duration or after collecting a predetermined amount of the source packets in the buffer.

7. The method of claim 6, further comprising a step of:
triggering the step of outputting, using the output selector, the reconstructed source packets at the rate equal to the first rate, when the source packets have been collected in the buffer for the predetermined time duration.

8. The method of claim 6, further comprising a step of:
triggering the step of outputting, using the output selector, the reconstructed source packets at the rate equal to the first rate, when the predetermined amount of the source packets has been collected in the buffer.

9. A receiver for providing forward error correction, comprising:
a packet receiver configured to receive source packets at a first rate;
an output selector configured to output the source packets to a media player at a rate less than the first rate;
a buffer configured to collect the source packets;
a correction unit configured to correct packet losses while the buffer collects the source packets; and
said output selector further configured to, after completing the output of the source packets to the media player at the rate less than the first rate, output to the media player reconstructed source packets at a rate equal to the first rate, either after collecting the source packets in the buffer for a predetermined time duration or after collecting a predetermined amount of the source packets in the buffer.

10. A non-transitory computer-readable medium having stored therein a computer program that, when executed by a computer processor, causes the computer processor to perform a method for providing forward error correction, wherein the method comprises steps of:
receiving, by a packet receiver, source packets at a first rate;
outputting, using an output selector, the source packets at a rate less than the first rate to a media player;
collecting the source packets in a buffer;
correcting, during the collecting and using a correction unit, packet losses; and
after completing the outputting, using the output selector, the source packets at the rate less than the first rate to the media player, outputting, using the output selector, reconstructed source packets to a media player at a rate equal to the first rate, either after collecting the source packets in the buffer for a predetermined time duration or after collecting a predetermined amount of the source packets in the buffer.

11. A method for providing forward error correction (FEC), comprising steps of:
receiving, by a packet receiver, video data at a first frame rate;
outputting, using an output selector, the video data at a frame rate less than the first frame rate to a media player;
collecting the video data in a buffer;
FEC decoding, using an FEC decoder and during the collecting, the video data, thereby generating decoded video data; and
after completing the outputting, using the output selector, the source packets at the rate less than the first rate to the media player, outputting to the media player the decoded video data at a frame rate equal to the first frame rate, either after collecting the video data in the buffer for a predetermined time duration or after collecting a predetermined amount of the video data in the buffer.

12. The method of claim 11, further comprising a step of:
triggering the step of outputting, using the output selector the decoded video data at the frame rate equal to the first frame rate, when the video data has been collected in the buffer for the predetermined time duration.

13. The method of claim 11, further comprising a step of:
triggering the step of outputting, using the output selector, the decoded video data at the frame rate equal to the first frame rate, when the predetermined amount of the video data has been collected in the buffer.

14. A receiver for providing forward error correction (FEC), comprising:
a packet receiver configured to receive video data at a first frame rate;
an output selector configured to output the video data to a media player at a frame rate less than the first frame rate;
a buffer configured to collect the video data;
an FEC decoder configured to FEC decode the video data while the buffer collects the video data, thereby generating decoded video data; and
said output selector further configured, after completing the output of the video data to the media player at the frame rate less than the first frame rate, to output the decoded video data to the media player at a frame rate equal to the first frame rate, either after collecting the video data in the buffer for a predetermined time duration or after collecting a predetermined amount of the video data in the buffer.

15. A non-transitory computer-readable medium having stored therein a computer program that, when executed by a computer processor, causes the computer processor to perform a method for providing forward error correction (FEC), wherein the method comprises steps of:

receiving, by an output selector, video data at a first frame rate;

outputting, using an output selector, the video data to a media player at a frame rate less than the first frame rate;

collecting the video data in a buffer;

FEC decoding, using an FEC decoder and during the collecting, the video data, thereby generating decoded video data; and after completing the outputting, using the output selector, the video data to the media player at the frame rate less than the first frame rate, outputting, using the output selector, the decoded video data at a frame rate equal to the first frame rate, either after collecting the video data in the buffer for a predetermined time duration or after collecting a predetermined amount of the video data in the buffer.

16. The method of claim 1, wherein the source data is live stream source data.

17. The receiver of claim 4, wherein the source data is live stream source data.

18. The method of claim 6, wherein the source packets are live stream source packets.

19. The receiver of claim 9, wherein the source packets are live stream source packets.

20. The method of claim 11, wherein the video data is live stream video data.

* * * * *